United States Patent
Samurada et al.

(10) Patent No.: US 10,156,746 B2
(45) Date of Patent: Dec. 18, 2018

(54) LIQUID CRYSTAL DISPLAY DEVICE

(71) Applicant: Japan Display Inc., Tokyo (JP)

(72) Inventors: Yoshihiro Samurada, Tokyo (JP);
Atsushi Nakamura, Tokyo (JP);
Tetsuro Ochi, Tokyo (JP); Hiroyuki Sakakura, Tokyo (JP)

(73) Assignee: Japan Display Inc., Tokyo (JP)

( * ) Notice: Subject to any disclaimer, the term of this patent is extended or adjusted under 35 U.S.C. 154(b) by 6 days.

(21) Appl. No.: 15/684,346

(22) Filed: Aug. 23, 2017

(65) Prior Publication Data

US 2017/0351137 A1 Dec. 7, 2017

Related U.S. Application Data

(63) Continuation of application No. 14/920,013, filed on Oct. 22, 2015, now Pat. No. 9,759,938.

(30) Foreign Application Priority Data

Oct. 28, 2014 (JP) .................................. 2014-219741

(51) Int. Cl.
*G02F 1/1333* (2006.01)
*F21V 8/00* (2006.01)

(52) U.S. Cl.
CPC ..... *G02F 1/133308* (2013.01); *G02B 6/0055* (2013.01); *G02B 6/005* (2013.01); *G02B 6/0083* (2013.01); *G02B 6/0088* (2013.01); *G02B 6/0093* (2013.01); *G02F 2001/133314* (2013.01); *G02F 2001/133331* (2013.01)

(58) Field of Classification Search
CPC ... G02F 1/133308; G02F 2001/133314; G02F 2001/133331; G02B 6/0055; G02B 6/0093; G02B 6/005
See application file for complete search history.

(56) References Cited

U.S. PATENT DOCUMENTS

| | | | |
|---|---|---|---|
| 8,958,033 B2 | 2/2015 | Aoki | |
| 9,078,341 B2 | 7/2015 | Suzuki | |
| 9,116,374 B2 | 8/2015 | Nishimoto | |
| 9,759,938 B2 * | 9/2017 | Samurada | ......... G02F 1/133308 |
| 2007/0065091 A1 | 3/2007 | Hinata | |

(Continued)

FOREIGN PATENT DOCUMENTS

| | | |
|---|---|---|
| JP | 2001-117077 | 4/2001 |
| JP | 2003-005158 | 1/2003 |

(Continued)

*Primary Examiner* — Dung Nguyen
(74) *Attorney, Agent, or Firm* — K&L Gates LLP

(57) ABSTRACT

According to one embodiment, a liquid crystal display device includes a liquid crystal display panel, a cover panel, a container case fixed to the cover panel and covering the liquid crystal display panel, and a backlight unit disposed in the container case and opposed to the liquid crystal display panel. The container case includes a bottom wall, and a sidewall directly opposed to at least one edge of the backlight unit with a gap interposed therebetween. At least one of a reflective sheet, light guide plate, and optical sheet of the backlight unit is opposed to the sidewall of the container case with the gap interposed therebetween, and is contained in the container case in a relatively displaceable manner with respect to the container case and the liquid crystal display panel.

9 Claims, 8 Drawing Sheets

(56) References Cited

U.S. PATENT DOCUMENTS

| | | | |
|---|---|---|---|
| 2011/0285934 A1 | 11/2011 | Watanabe | |
| 2013/0077017 A1 | 3/2013 | Aoki | |
| 2016/0091760 A1 | 3/2016 | Ogura | |
| 2017/0038522 A1* | 2/2017 | Zeng | G02B 6/0051 |
| 2017/0038523 A1 | 2/2017 | Ochi | |

FOREIGN PATENT DOCUMENTS

| | | |
|---|---|---|
| JP | 2010-026216 | 2/2010 |
| JP | 5122657 | 1/2013 |

\* cited by examiner

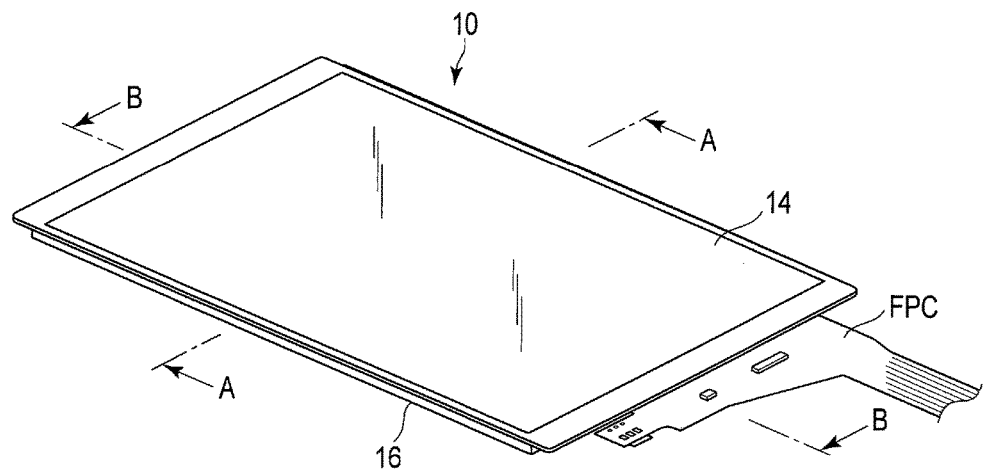
F I G. 1
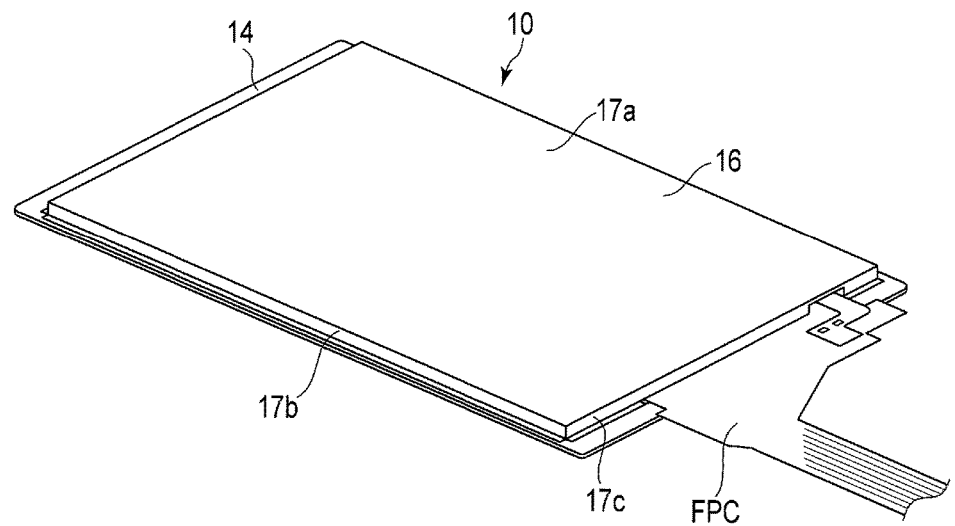
F I G. 2

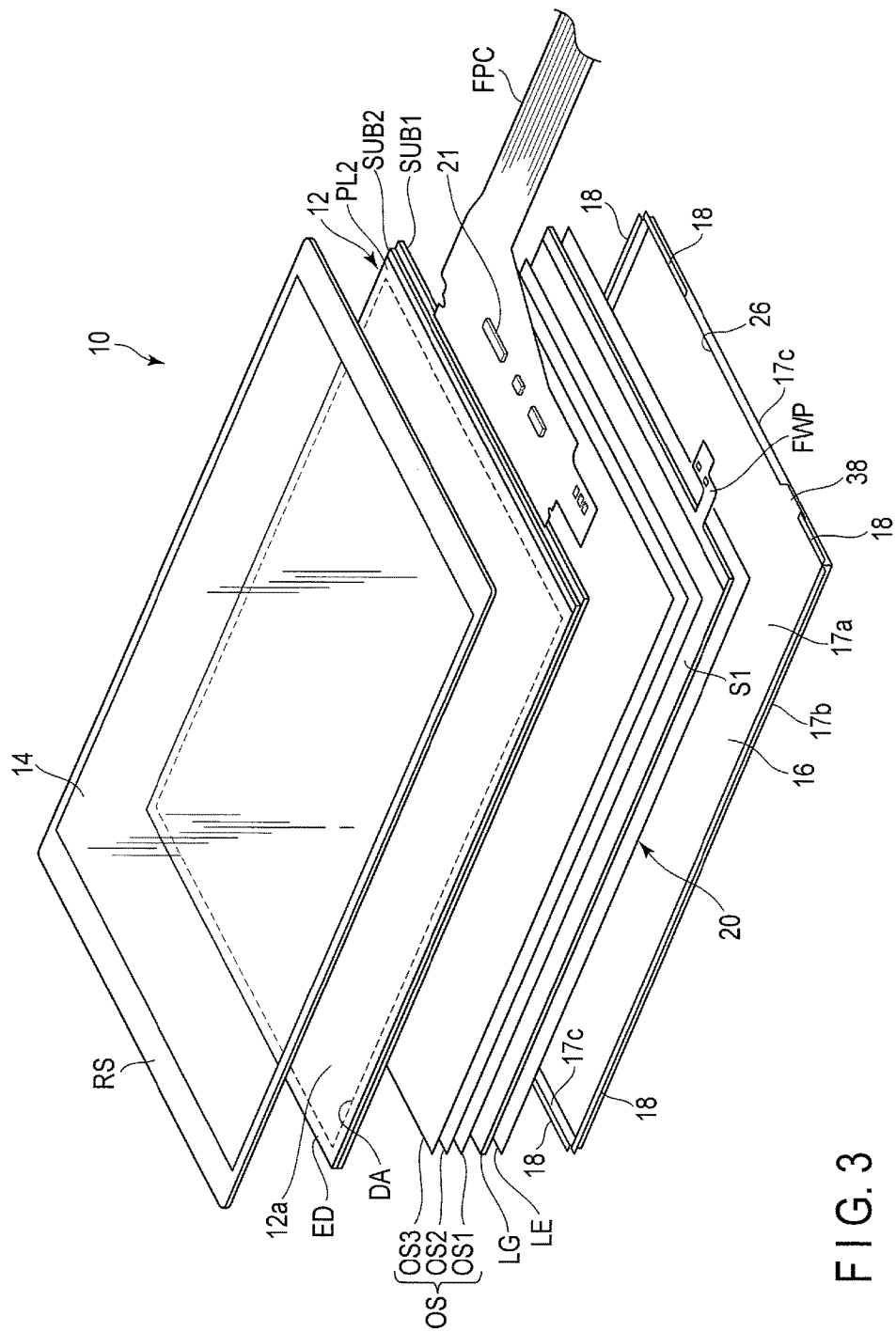
F I G. 3

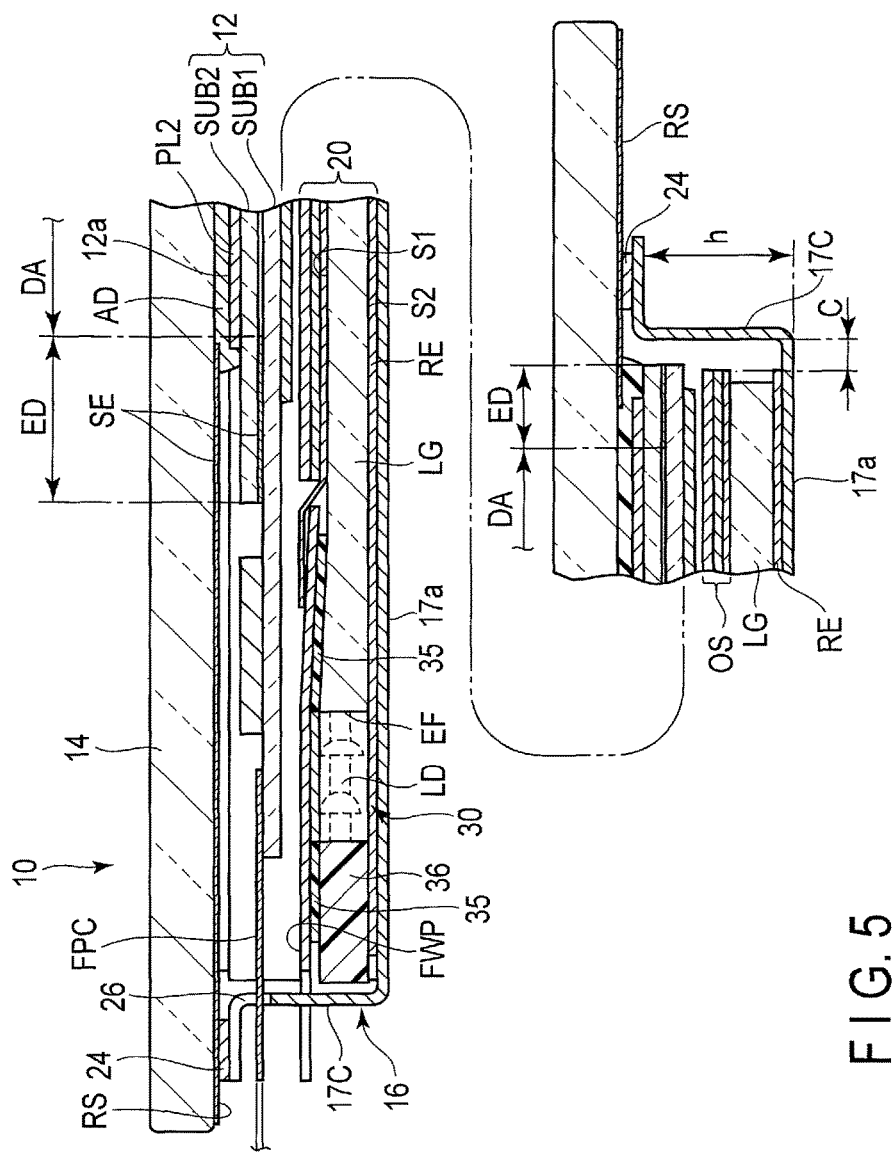
F I G. 5

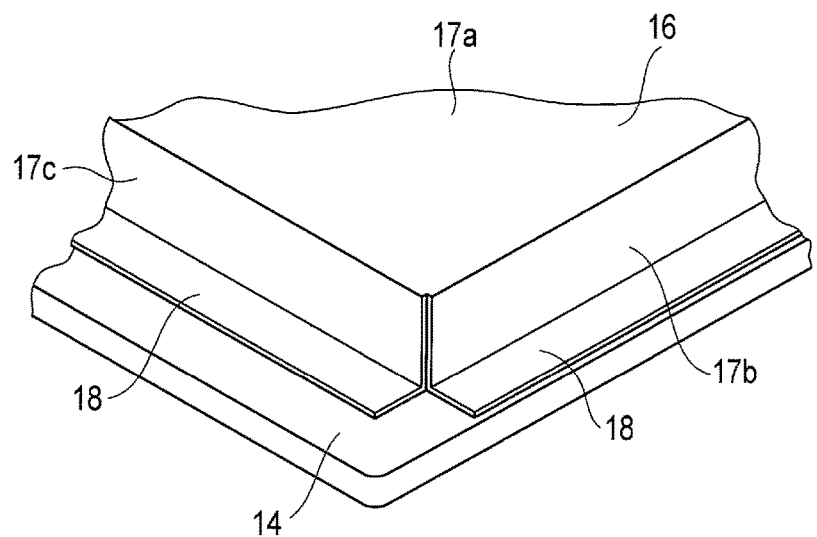
F I G. 6
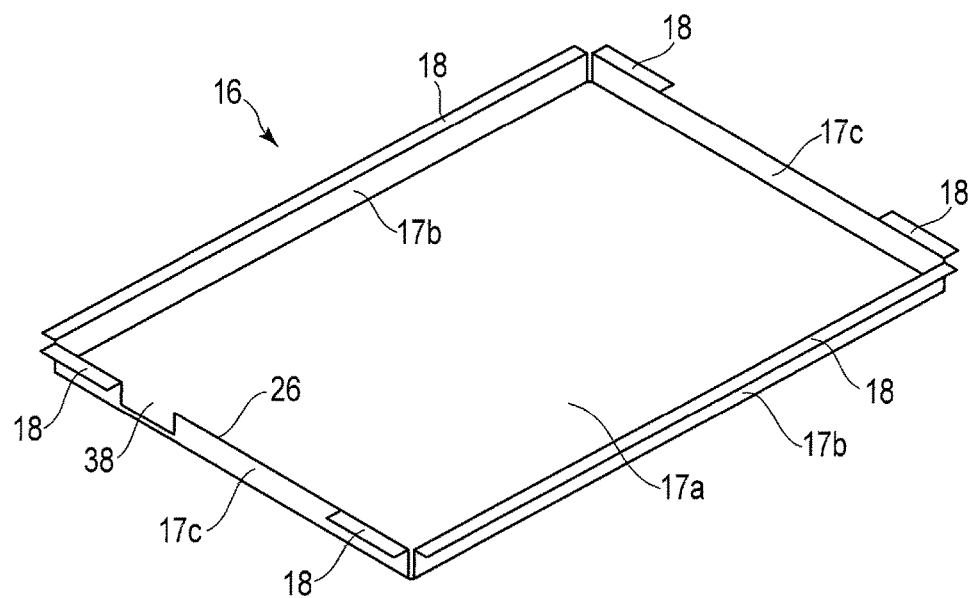
F I G. 7

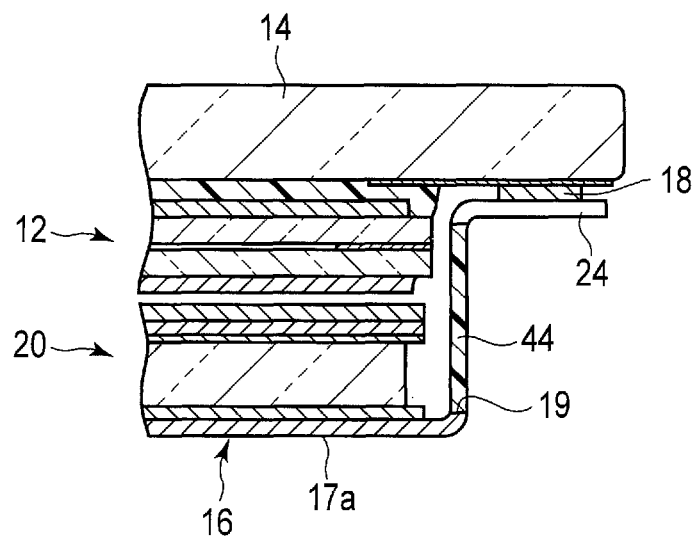
F I G. 12
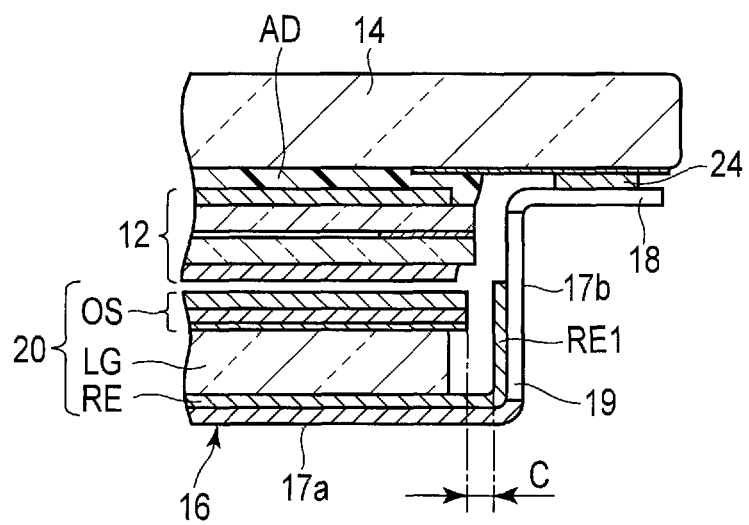
F I G. 13

LIQUID CRYSTAL DISPLAY DEVICE

CROSS REFERENCES TO RELATED APPLICATIONS

The present application is a continuation application of U.S. patent application Ser. No. 14/920,013, filed Oct. 22, 2015, which application claims priority to Japanese Priority Patent Application JP 2014-219741 filed in the Japan Patent Office on Oct. 28, 2014, the entire content of which is hereby incorporated by reference.

FIELD

Embodiments described herein relate generally to a liquid crystal display device.

BACKGROUND

In recent years, liquid crystal display devices are used in various mobile devices such as smartphones, personal digital assistants (PDAs), and tablet computers. Generally, a liquid crystal display device includes a liquid crystal display panel, and a surface light source which is overlaid on the rear surface of the liquid crystal display panel for illumination. The surface light source may be, for example, a backlight unit which includes a reflective layer, light guide plate, optical sheet, light source such as LED, and rectangular resin frame. The reflective layer, light guide plate, and optical sheet are layered to overlap and are fitted in the resin frame. That is, the peripheries of the reflective layer, light guide plate, and optical sheet are maintained and positioned by the resin frame.

The resin frame is fixed to the liquid crystal display panel by a double-sided tape or an adhesive agent, and the backlight unit is positioned in line with the liquid crystal display panel. The liquid crystal display panel has a display area and a frame-shaped non-display area (frame area) around the display area. The resin frame of the backlight unit is fixed to the frame area of the liquid crystal display panel by a double-sided tape.

Size reduction of the frame area is greatly demanded to meet the requirement of enlargement of the display area. The frame area of the liquid crystal display panel is thus reduced more and more. However, the reduced frame area means that the area for the double-sided tape is reduced as well, and the area of the double-sided tape will not be sufficient. That is, sufficient adhesion of the resin frame will be difficult to secure.

Furthermore, when the backlight unit is manufactured thinner, the resin frame needs to be manufactured thinner as well. In that case, the durability of the resin frame decreases, and an assembly operation of optical sheets with such a thin resin frame becomes difficult.

SUMMARY

This application relates generally to a liquid crystal display device.

In an embodiment, a liquid crystal display device comprising a liquid crystal display panel; a cover panel overlaid on a display surface of the liquid crystal display panel; a container case fixed to the cover panel and covering the liquid crystal display panel; and a backlight unit comprising a reflective sheet, a light guide plate, and an optical sheet on the light guide plate in the container case, the backlight unit opposed to a rear surface of the liquid crystal display panel, wherein the container case comprises a bottom wall opposed to the backlight unit, and a sidewall directly opposed to at least one edge of the backlight unit with a gap interposed therebetween, and at least one of the reflective sheet, light guide plate, and optical sheet of the backlight unit is opposed to the sidewall of the container case with the gap interposed therebetween, and is arranged in the container case in a relatively displaceable manner with respect to the container case and the liquid crystal display panel.

Additional features and advantages are described herein, and will be apparent from the following Detailed Description and the figures.

BRIEF DESCRIPTION OF THE FIGURES

FIG. 1 is a perspective view which shows a liquid crystal display device of a first embodiment from a display surface side.

FIG. 2 is a perspective view which shows the liquid crystal display device from a rear surface side.

FIG. 3 is an exploded perspective view showing the liquid crystal display device.

FIG. 5 is a cross-sectional view which shows the liquid crystal display device taken along line B-B of FIG. 1.

FIG. 6 is a perspective view which shows a container case of the liquid crystal display device in a partly enlarged manner.

FIG. 7 is a perspective view which shows a container case of a first modification.

FIG. 12 is a cross-sectional view which shows a liquid crystal display device of a fifth modification.

FIG. 13 is a cross-sectional view which shows a liquid crystal display device of a sixth modification.

DETAILED DESCRIPTION

Figure 4:
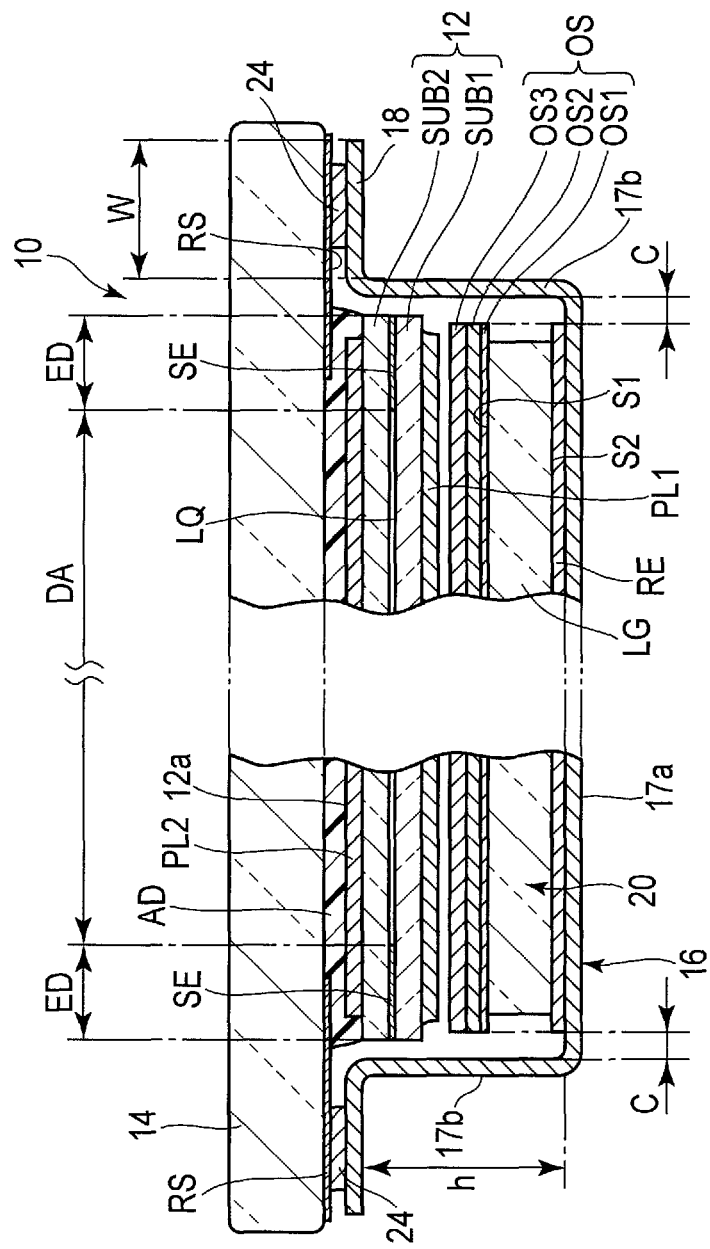
FIG. 4 is a cross-sectional view which shows the liquid crystal display device taken along line A-A of FIG. 1.

Various embodiments and modifications will be described hereinafter with reference to the accompanying drawings. In general, according to one embodiment, a liquid crystal display device comprises a liquid crystal display panel, a cover panel overlaid on a display surface of the liquid crystal display panel, a container case fixed to the cover panel and covering the liquid crystal display panel, and a backlight unit including a reflective sheet, a light guide plate, and an optical sheet on the light guide plate in the container case in a layered manner, the backlight unit opposed to a rear surface of the liquid crystal display panel, wherein the container case comprises a bottom wall opposed to the backlight unit, and a sidewall directly opposed to at least one edge of the backlight unit with a gap interposed therebetween, and at least one of the reflective sheet, light guide plate, and optical sheet of the backlight unit is opposed to the sidewall of the container case with the gap interposed therebetween, and is contained in the container case in a relatively displaceable manner with respect to the container case and the liquid crystal display panel.

Note that the disclosure herein is for the sake of exemplification, and any modification and modification conceived within the scope and spirit of the invention by a person having ordinary skill in the art are naturally encompassed in the scope of invention of the present application. Furthermore, a width, thickness, shape, and the like of each element are depicted schematically in the Figures for the sake of simpler explanation as compared to actual embodiments, and they are not to limit the interpretation of the invention of the present application. Furthermore, in the description and Figures of the present application, structural elements having the same or similar functions will be referred to by the same reference numbers and detailed explanations of them that are considered redundant may be omitted.

First Embodiment

FIGS. 1 and 2 are perspective views showing a liquid crystal display device of the first embodiment from the display surface side and the rear side, respectively. FIG. 3 is a perspective view which shows the liquid crystal display device in a disassembled manner.

The liquid crystal display device 10 is used in various electronic devices such as a smartphone, tablet computer, feature phone, notebook computer, portable game console, electronic dictionary, and television.

As shown in FIGS. 1 to 3, the liquid crystal display device 10 comprises an active-matrix liquid crystal display panel 12, a transparent cover panel 14 overlaid on a display surface 12a of the liquid crystal display panel 12 to cover the entirety of the display surface, a container case 16 fixed to the cover panel 14 and covering the rear surface side of the liquid crystal display panel 12, and a backlight unit 20 used as a surface light source disposed inside the container case 16 to be opposed to the rear surface of the liquid crystal display panel 12.

FIG. 4 is a cross-sectional view which shows the liquid crystal display device taken along line A-A in FIG. 1. FIG. 5 is a cross-sectional view which shows the liquid crystal display device taken along line B-B in FIG. 1.

As shown in FIGS. 3 to 5, the liquid crystal display panel 12 includes a rectangular plate-shaped first substrate SUB1, a rectangular plate-shaped second substrate SUB2 which is opposed to the first substrate SUB1, and a liquid crystal layer LQ which is held between the first substrate SUB1 and the second substrate SUB2. The periphery of the second substrate SUB2 is adhered to the first substrate SUB1 with a sealant SE. A polarizer PL2 is adhered to the surface of the second substrate SUB2 and they form the display surface 12a of the liquid crystal display panel 12. A polarizer PL1 is adhered to the surface of the first substrate SUB1 (the rear surface of the liquid crystal display panel 12).

The liquid crystal display panel 12 includes a display area (active area) DA which displays an image in the area surrounded by the sealant SE and a rectangular frame area ED disposed around the display area DA. The liquid crystal display panel 12 is of transmissive type which has a transmissive display function to display an image by selectively passing light from the backlight unit 20. The liquid crystal display panel 12 may include a structure corresponding to a transverse field mode mainly using a transverse field which is substantially parallel to the main surface of the substrate, or a vertical field mode mainly using a vertical field which is substantially vertical to the main surface of the susbtrate.

In the example depicted, a flexible printed circuit FPC is connected to the first substrate SUB1. The flexible printed circuit FPC is used as a signal supplier which supplies signals necessary to drive the liquid crystal display panel 12, and semiconductor elements including a driver IC chip 21 and the like are mounted on the flexible printed circuit FPC. The flexible printed circuit FPC starts from the short side of the first substrate SUB1 extending outside of the liquid crystal display panel 12, for example.

As shown in FIGS. 1 to 5, the cover panel 14 is formed of a glass plate or an acrylic transparent resin, and formed in a rectangular plate-like shape. The cover panel 14 has a size (width and length) greater than the liquid crystal display panel 12, and has an area greater than the liquid crystal display panel in a plan view. The lower surface (rear surface) of the cover panel 14 is adhered to the display surface 12a of the liquid crystal display panel 12 with, for example, a transparent adhesive agent AD to cover the entire surface of the liquid crystal display panel 12. The periphery of the cover panel 14 projects outward over the outer periphery of the liquid crystal display panel 12. Each of the long sides of the cover panel 14 extends substantially parallel to the long sides of the liquid crystal display panel 12 and is apart from these long sides at a certain interval. Each of the short sides of the cover panel 14 extends substantially parallel to the short side of the liquid crystal display panel 12 and is apart from these short sides at a certain interval. In the present embodiment, a gap between the long side of the cover panel 14 and the long side of the liquid crystal display panel 12 is smaller than a gap between the short side of the cover panel 14 and the short side of the liquid crystal display panel 12. That is, the width of the long-side periphery of the glass panel is smaller than the width of the short-side periphery of the glass panel.

A frame-shaped light shielding layer RS is formed on the lower surface (rear surface) of the cover panel 14 (the surface closer to the liquid crystal display panel). In the cover panel 14, an area which is not opposed to the display area DA of the liquid crystal display panel 12 is covered by the light shielding layer RS. The light shielding layer RS may be formed on the upper surface (outer surface) of the cover panel 14.

As shown in FIGS. 2 to 5, the container case 16 is formed in a flat rectangular lid-like shape with a plate metal such as stainless. The container case 16 is formed of, for example, a plate metal having a thickness of 0.1 to 0.15 mm through a bending treatment or a drawing treatment. The container case 16 is larger than the liquid crystal display panel 12 and smaller than the cover panel 14 in planar viewed, and has a rectangular bottom wall 17a, a pair of long sidewalls 17b and a pair of short sidewalls 17c each disposed at corresponding side edge of the bottom wall 17a, and a flange 18 extending outward from upper edges of the sidewalls. In the present embodiment, the long sidewalls 17b are disposed substantially perpendicular to the bottom wall 17a and extend over the entirety of the long sides of the bottom wall 17a. The short sidewalls 17c are disposed substantially perpendicular to the bottom wall 17a and extend over the entirety of the short sides of the bottom wall 17a. Sidewalls 17b and 17c have a height h which is slightly greater than the sum of the thickness of the liquid crystal display panel 12 and the thickness of the backlight unit 20 described later.

The flange 18 extends outward and substantially perpendicular to the sidewalls. In the present embodiment, the flange 18 is provided on the entirety of sidewalls 17b and 17c. The flange 18 has a width W which is set to a value of sufficient adhesion, namely, 0.7 to 1 mm, for example. In the present embodiment, the bottom wall 17a, sidewalls 17b and 17c, and flange 18 are all formed of a single plate metal through a bending treatment.

As shown in FIGS. 2 to 4 and 6, the container case 16 structured as above is fixed to the cover panel 14 by adhering the flange 18 to the lower surface of the cover panel 14 with a double-sided tape 24, and the container case 16 covers the liquid crystal display panel 12. The flange 18 of sidewalls 17b and 17c is fixed to the periphery of the lower surface of the cover panel 14 outside the liquid crystal display panel 12 and is aligned along each side of the cover panel 14. The bottom wall 17a of the container case 16 is opposed substantially parallel to the rear surface of the liquid crystal display panel 12 with a gap therebetween. Sidewalls 17b and 17c of the container case 16 are opposed to their corresponding side edges of the liquid crystal display panel 12 with a very slight gap therebetween except one of the short sidewalls 17c. The excepted short sidewall 17c is, as shown in FIG. 5, opposed to its corresponding short side of the liquid crystal display panel 12 with a gap relatively large as compared to the gap C between the other sidewalls and the liquid crystal display panel 12. A notch 26 is formed in the excepted sidewall 17c and the flange 18, and the flexible printed circuit FPC extends from the liquid crystal display panel 12 to the outside of the container case 16 passing through the notch 26.

Note that the fixation of the container case 16 and the cover panel 14 may be performed with a hotmelt adhesive agent, epoxy adhesive agent, UV curing adhesive agent, and the like instead of the double-sided tape 24.

As shown in FIGS. 3 to 5, the backlight unit 20 is disposed inside the container case 16 and is opposed to the rear surface of the liquid crystal display panel 12. The backlight unit 20 includes a flat rectangular light guide plate LG, rectangular reflective sheet RE, optical sheet OS overlaid on the light guide plate LG, and light source unit 30 which passes light through the light guide plate LG.

The reflective sheet RE is disposed on the bottom wall 17a of the container case 16 and is opposed to substantially the entirety of the bottom wall 17a. The light guide plate LG includes a first main surface S1 which is a light exit surface, second main surface S2 opposite to the first main surface S1, and incident end face EF connecting the first main surface S1 and the second main surface S2 together. The light guide plate LG is overlaid on the reflective sheet RE with the second main surface S2 being opposed to the reflective sheet RE. The optical sheet OS is light transmissive and is overlaid on the first main surface S1 of the light guide plate LG. In the present embodiment, the optical sheet OS is composed of, for example, a diffusion sheet OS1 formed of a synthetic resin such as polyethyrene terephthalate, prism sheet OS2, and diffusion sheet OS3. The optical sheet components are formed in a rectangular shape with substantially the same size and are layered orderly on the first main surface S1 of the light guide plate LG. The optical sheet OS is opposed to the rear surface of the liquid crystal display panel 12 with a slight gap and is opposed to the entirety of the display area DA of the liquid crystal display panel 12.

The reflective sheet RE, light guide plate LG, and optical sheet OS are not adhered to each other or to the container case 16 but are disposed on the bottom wall 17a. Furthermore, the optical sheet OS is not adhered to the liquid crystal display panel 12 but is disposed inside the container case 16, and the backlight unit 20 is not held by such a resin frame specifically prepared for the backlight unit 20 to hold the light guide plate LG, reflective sheet RE, optical sheet OS, and light source unit 30 integrally.

The reflective sheet RE, optical sheet OS, and light guide plate LG are formed to be slightly smaller than the bottom wall 17a of the container case 16. The optical sheet OS and the light guide plate LG have four edges, and at least three edges excluding an edge at the light source side are directly opposed to sidewalls 17b and 17c of the container case 16 with a certain gap (clearance) C therebetween, that is, they are opposed to sidewalls 17b and 17c without any intermediate such as a resin frame interposed therebetween. Therefore, optical sheet components OS1, OS2, and OS3 and the light guide plate LG are arranged such that they can relatively shift in the surface direction with respect to the container case 16 and the liquid crystal display panel 12 by at least the gap C. In general, an optical sheet OS formed of a synthetic resin material or the like has a greater coefficient of thermal expansion than that of a container case 16 formed of a plate metal, and the thermal expansion and contraction are greater than that of the container case 16. However, as described above, the components of the backlight unit 20 are contained in the container case 16 while they are not fixed to each other and the gap C is secured in the container case 16, and thereby, a deformation (thermal expansion and contraction) of the components of the backlight unit 20 and a movement of the components can be compensated for by the gap C. Accordingly, a possible distortion of the optical sheet OS or the like can be prevented, quality of transmissive light from the backlight can be maintained regardless of the thermal condition in the container, and possible deterioration of display quality of the liquid crystal panel can be prevented.

Note that, in the present embodiment, the reflective sheet RE, light guide plate LG, and optical sheet OS are disposed on the bottom wall 17a while they are not adhered together or to the container case 16, and with this structure, expansion and movement of these components are allowed in the container case 16. Furthermore, such a structure may naturally include at least one of the structural components which is not connected to other components layered on top and bottom thereof and a gap which allows the movement of the unconnected component.

The gap C is determined on the basis of the properties and coefficients of thermal expansion of the structural components of the backlight unit 20. For example, the gap C of the optical sheet OS in the short-side direction is greater than or equal to the short-side length of the optical sheet $OS \times 1.7 \times 10^{-6}$ mm, and the gap C of the optical sheet OS in the long-side direction is greater than or equal to the long-side length of the optical sheet $OS \times 1.7 \times 10^{-6}$ mm. If the gap C is too wide, a narrowed frame effect of the liquid crystal display panel 12 decreases, movement of each component becomes excessive, and the appearance of the device is degraded (such that the edges of the backlight unit are visible from the outside), for example. Therefore, the gap C is less than or equal to a half of the width of the frame area ED (this frame area ED corresponds to the most narrow frame area in the long side of the frame area) of the liquid crystal display panel 12.

Note that the gap C should preferably be secured between the edges of each structural component of the backlight unit 20 (four edges in the present embodiment) and sidewalls 17b and 17c of the container case 16. In consideration of a storage condition, some components of the backlight unit 20, namely, the optical sheet OS, for example, may be arranged such that one edge thereof contacts sidewalls 17b and 17c of the container case 16 since the optical sheet OS can be displaced independently. In such a case, the other edge of the optical sheet OS is opposed to sidewalls 17b and 17c with a gap of 2C, and thermal expansion of the optical sheet OS can be absorbed by the 2C gap and the look of the device can be maintained since the 2C gap falls within a range of the width W of the frame area ED.

As shown in FIG. 5, the light source unit 30 includes a plurality of light-emitting diodes LD functioning as a light source, and a support frame 36 on which the light-emitting diodes LD are mounted. The light source unit 30 is disposed on the reflective sheet RE in the container case 16, and located between the light guide plate LG and the side wall 17c of the container case 16. The light-emitting diodes LD are arranged to face the incident end face EF of the light guide plate LG. A flexible circuit board FWP used to supply electricity to the light-emitting diodes LD is fixed by a double sided tape 35 to an end portion of the light guide plate LG and the support frame 36. The flexible circuit board FWP extends from one end of the light guide plate LG and is drawn outside through a notch 38 formed in the sidewall 17c of the container case 16. The light from the light-emitting diodes LD enters the light guide plate LG through the incident end face EF of the light guide plate LG, travels through the light guide plate LG, and exits to the liquid crystal display panel 12 side from the entirety of the light exit surface. The exiting light is diffused by the optical sheet OS and irradiated on the liquid crystal display panel 12.

As shown in FIG. 5, an end portion of the lower most optical sheet OS is drawn on the flexible circuit board FWP and fixed thereto. Thus, the optical sheet OS is positioned. Note that, optical sheets OS may be only placed on the light guide plate LG and not be fixed to any other parts.

As above, the backlight unit 20 is contained in the container case 16 and is maintained to be opposed to the liquid crystal display panel 12 by the container case 16. Furthermore, the backlight unit 20 is not adhered to the liquid crystal display panel 12 or the container case 16 and is positioned by the container case 16 such that a slight movement is performable in the surface direction. As a result, the structural components of the backlight unit 20 can perform relative displacement without interference with the container case 16 and the liquid crystal display panel 12 even if the components are deformed by thermal expansion or the like.

The liquid crystal display device 10 can be assembled as follows, for example. Initially, the cover panel 14 is positioned with respect to the liquid crystal display panel 12, and the cover panel 14 is adhered to the liquid crystal display panel 12 at the display surface 12a side. Then, an adhesive agent or a double-sided tape is applied to the periphery of the cover panel 14, that is, a frame-shaped mergin such that the container case 16 is fixed to the cover panel 14. On the other hand, structural components of the backlight unit 20 are placed on, in other words, dropped in the bottom wall 17a of the container case 16 in a layered arrangement. At that time, the structural components are not required to be fixed together by an adhesive agent or the like or to be positioned specifically, but they are simply placed in the container case 16 in order. Therefore, the installation of the backlight unit 20 is facilitated.

Then, the liquid crystal display panel 12 and the cover panel 14 are positioned with respect to the container case 16 containing the backlight unit 20, and the liquid crystal display panel 12 is dropped in the container case 16. With the position being maintained, a flange (locking) 18 of the container case 16 is adhered to the lower periphery of the cover panel 14 with an adhesive agent or the double-sided tape 24. Through this process, the liquid crystal display device can be obtained.

In the liquid crystal display device 10 manufactured as above, the backlight unit 20 is maintained or positioned with respect to the container case 16 which is formed of a plate metal, and the container case 16 is fixed to the cover panel 14. Consequently, a conventionally resin frame used specifically for a backlight unit can be omitted, and the backlight unit 20 is not fixed to the liquid crystal display panel 12. Therefore, even if the frame area ED of the liquid crystal display panel 12 is narrowed, the container case 16 and the cover panel 14 are fixed to each other such that a sufficient fixation area can be maintained and secured fixation can be achieved. Even if the frame is narrowed, the liquid crystal display device of high durability can be achieved with a backlight unit firmly secured to the liquid crystal display panel. At the same time, a fixation space of the liquid crystal display panel 12 and the backlight unit 20 which is conventionally secured in the frame area is omitted, and the width of the frame area ED can be reduced remarkably, for example, less than 0.8 mm in the liquid crystal display panel 12.

The plate metal used for the container case 16 has a thickness of 0.1 to 0.15 mm and the sidewalls of the container case 18 and the flange (locking) 18 are formed thin through a bending treatment of the plate metal. Therefore, when the liquid crystal display device 10 is incorporated in a electronic device set, the thickness of the electronic device can be minimized.

In the assembly of the liquid crystal display device 10, the structural components of the backlight unit 20 are placed and layered in the container case 16 without adhesion, and thus, the assembly can be performed easily and securely. Furthermore, since a fixation area between the container case 16 and the cover panel 14 can be set relatively large, many options are available for the fixation member in addition to the double-sided tape and the adhesive agent.

As can be understood from the above, the present embodiment can provide a liquid crystal display device with a reduced frame area, a securely maintained backlight unit, and improved durability.

Now, modifications of the liquid crystal display device are explained.

First Modification

FIG. 7 shows a container case of the liquid crystal display device of the first modification. The flange 18 of the container case 16 is not necessarily provided at the entire periphery of the container case 16 but may be provided partly at sidewalls 17b and 17c. That is, the flange 18 may partly be omitted or notched. As shown in FIG. 7, the flange 18 on each short sidewall 17c is omitted in the center in the longitudinal direction, that is, flanges 18 are provided at both ends of each sidewall 17c in the longitudinal direction in the first modification.

Second Modification

Figure 8:
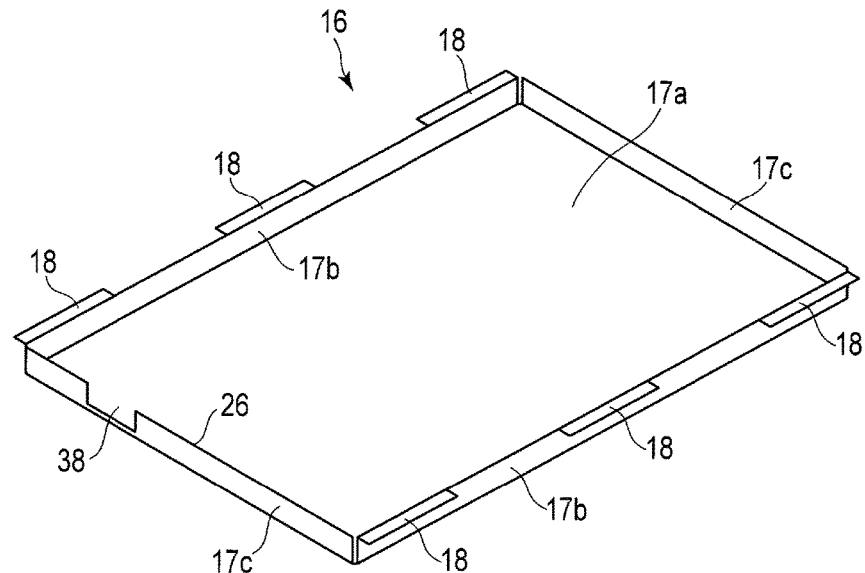
FIG. 8 is a perspective view which shows a container case of a second modification.

FIG. 8 shows a container case of the liquid crystal display device of the second modification. The flange 18 of the container case 16 is not necessarily provided on the entire periphery of the container case 16 but may be provided on two parallel sidewalls 17b or two parallel sidewalls 17c. As shown in FIG. 8, flanges 18 are provided on the long sidewalls 17b and are not provided on the short sidewalls 17c at all in the second modification. Conversely, flanges 18 may be provided at two short sidewalls 17c alone. In the second modification, the flange 18 is provided at each of sidewalls 17b with several notches in the longitudinal direction, that is, the flanges 18 are provided on each of sidewalls 17b intermittently at the center and both ends in the longitudinal direction.

In the first and second modifications, the length and the number of flange 18 can be determined arbitrarily as long as the container case 16 can be fixed to the cover panel 14 with sufficient adhesion. With the flanges 18 provided intermittently, the length of each flange 18 can be reduced. This is effective for a bending treatment of the plate metal to easily form flanges 18 with high squareness and flatness.

Third Modification

Figure 9:
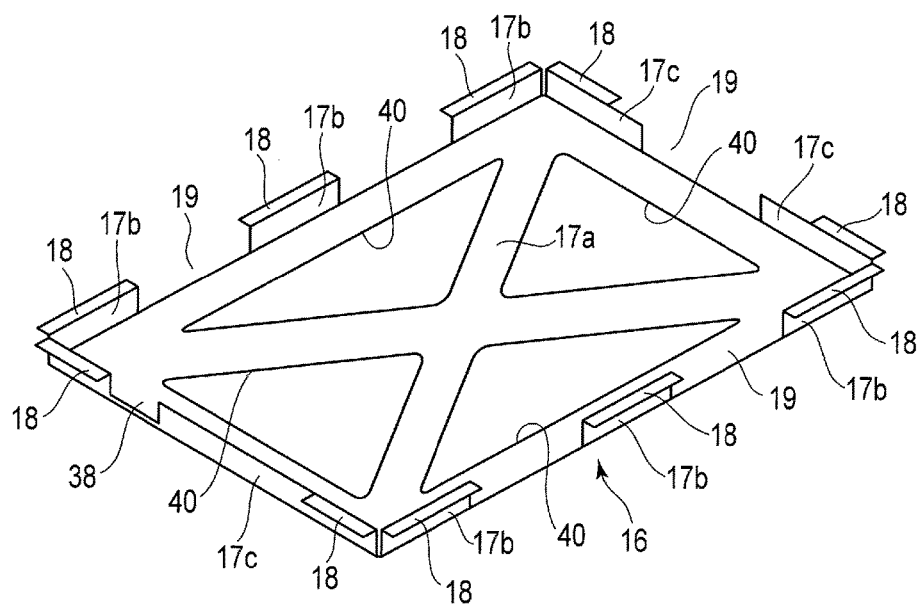
FIG. 9 is a perspective view which shows a container case of a third modification.
Figure 10:
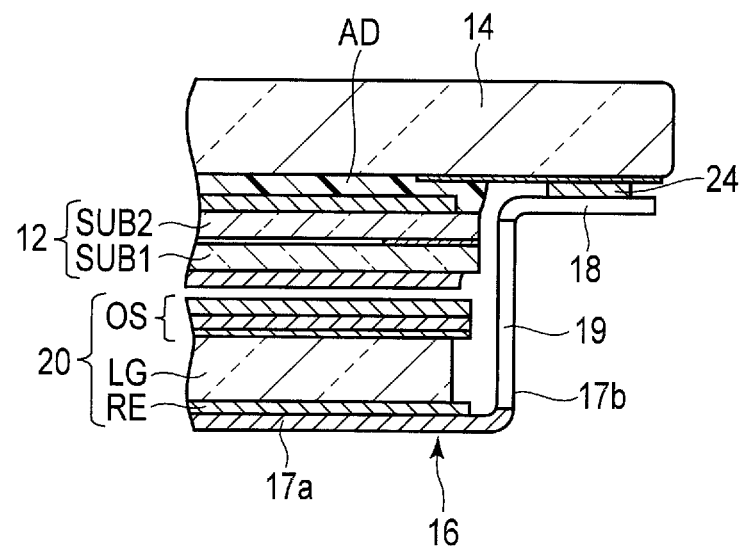
FIG. 10 is a cross-sectional view which shows a liquid crystal display device according to the third modification.

FIG. 9 shows a container case of the liquid crystal display device of the third modification and FIG. 10 is a cross-sectional view which shows a part of the liquid crystal display device of the third modification. Sidewalls 17b and 17c of the container case 16 are not necessarily formed over the entire periphery of the container case 16, but may be formed with notches to be intermittent in the longitudinal direction. As shown in FIGS. 9 and 10, each of the long sidewalls 17b of the container case 16 is notched in several parts such that each of sidewalls 17b is divided into three parts; parts at both ends and a center part in the longitudinal direction of the case edge. On the other hand, each of the short sidewalls 17c is notched in the center part such that each of sidewalls 17c is divided into two parts at both ends in the longitudinal direction of the case edge. Furthermore, a plurality of openings 40 may be formed in the bottom wall 17a of the container case 16 for weight reduction.

Even if the sidewalls are formed at intervals, the backlight unit 20 can be sufficiently maintained and positioned in the container case 16 with the above structure. Furthermore, the length of each of sidewalls 17b and 17c can be decreased, and thus, loads in bending and drawing treatments of the container case 16 can be reduced. Consequently, the sidewalls can easily be formed with high squareness and flatness.

Fourth Modification

Figure 11:
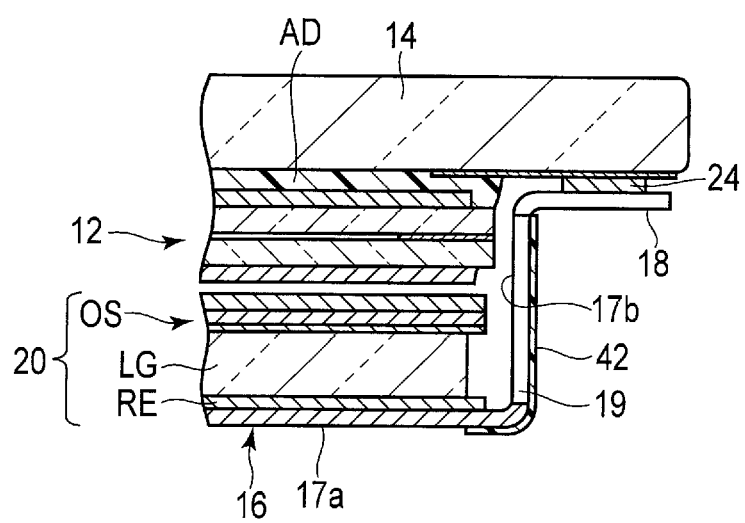
FIG. 11 is a cross-sectional view which shows a liquid crystal display device of a fourth modification.

FIG. 11 is a cross-sectional view which shows a part of the liquid crystal display device of the fourth modification. As described above, when notched ports 19 are formed by cutting sidewalls 17b and 17c of the container case 16, light leakage and contaminant may occur through the notched ports 19. To prevent these matters, tapes 42 may be adhered to the outer surfaces of the sidewalls of the container case 16 to block the notched ports 19.

Fifth Modification

FIG. 12 is a cross-sectional view which shows a part of the liquid crystal display device of the fifth modification. As described above, when notched ports 19 are formed in sidewalls 17b and 17c of the container case 16, synthetic resin 44 may be filled in the notched ports 19 as shown in FIG. 12 to prevent light leakage and contamination through the notched ports 19.

Sixth Modification

FIG. 13 is a cross-sectional view which shows a part of the liquid crystal display device of the sixth modification. When notches (omitted ports 19) are provided at sidewalls 17b or 17c of the container case 16, the omitted ports 19 may be covered with a part of the structural components of the backlight unit 20, for example, the reflective sheet RE. Here, the reflective sheet RE is formed to be larger than usual and its periphery is bent along the inner surface of sidewalls 17b as a bent part RE1. The bent part blocks the omitted ports 19 at the areas corresponding to the light guide plate LG and the optical sheet OS.

Note that, even in this case, the size of each structural component of the backlight unit is adjusted to secure a gap C between the bent part RE1 of the reflective sheet RE and the edges of the light guide plate LG and the optical sheet OS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The scope of the inventions encompasses structures and manufacturing processes achievable by a person having ordinary skill in the art through application of arbitral design changes to the above-described structure and manufacturing process as long as the technical concept of the present application is adopted therein. For example, the liquid crystal display panel may not be attached to the cover panel in the initial process, but the liquid crystal display panel may be contained in the container case with the backlight unit stored therein, and then the liquid crystal display panel and the flange of the container case may be together attached to the cover panel. Alternately, the liquid crystal display panel may not be adhered to the cover panel but may be arranged slightly movable in the container case. Furthermore, the liquid crystal display panel may be fixed to the backlight unit, and the liquid crystal display panel and the backlight unit fixed to each other may be contained in the container case.

Furthermore, other than the above advantages, advantages obvious from the description of the present application, and advantages arbitrarily conceivable by a person having ordinary skill in the art from the description of the present application are naturally acknowledged as advantages of the present application.

For example, the number of the components of the optical sheet is not limited to three but may be increased or decreased as required. The shape of the liquid crystal display panel, components of the backlight unit, and container case is not limited to a rectangle but may be an oval or a track-like shape. Materials used for the structural components of the optical sheet are not limited to the above-described materials and may be selected from various options.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
    a cover panel;
    a polarizer facing the cover panel;
    a display panel facing the polarizer;

a backlight unit opposed to the display panel and comprising a light guide plate, and an optical sheet between the display panel and the light guide plate; and a container case fixed to the cover panel and housing the polarizer, the display panel and the backlight unit; wherein the container case comprises a bottom wall facing a back of the backlight unit, and a sidewall facing a side of the backlight unit, the display panel and the polarizer with a gap, and the polarizer is fixed to the cover panel with an adhesive, the sidewall includes a flange extending toward an edge of the cover panel, the flange is adhered to a rear surface of the cover panel with a double-sided tape, without protruding the edge of the cover panel, and the double-sided tape includes an edge opposing to the adhesive with a gap, and any part of the container case doesn't cover a top surface of the cover panel.

2. The display device of claim 1, wherein the flange is provided over the entire length of the sidewall.

3. The display device of claim 1, wherein the flange is provided intermittently.

4. The display device of claim 1, wherein the container case comprises a plurality of sidewalls, and at least two sidewalls opposing to each other have the flange.

5. The display device of claim 1, wherein at least one sidewall of the container case includes an omitted port.

6. The display device of claim 1, wherein the container case is formed by bending a plate-shaped metal.

7. The display device of claim 1, which further comprises a light shielding layer on the rear surface of the cover panel.

8. The display device of claim 7, wherein the light shielding layer is overlaid with the double-sided tape.

9. The display device of claim 8, wherein the light shielding layer includes an end portion overlaid with the adhesive and the display panel, and the gap faces the light shielding layer.

* * * * *